May 28, 1968 A. L. HALE ET AL 3,385,169
HYDRAULIC SYSTEM FOR MAINTAINING
THE POSITION OF A FLUID MOTOR
Filed Sept. 30, 1965 2 Sheets-Sheet 1
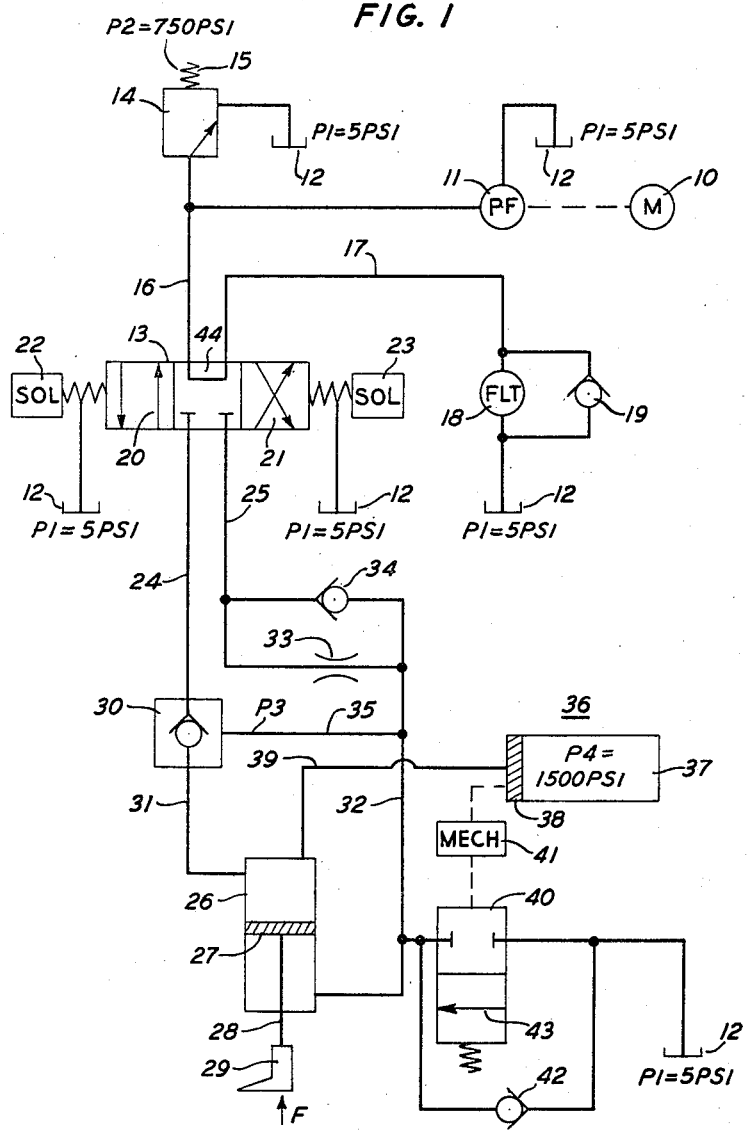
FIG. 1
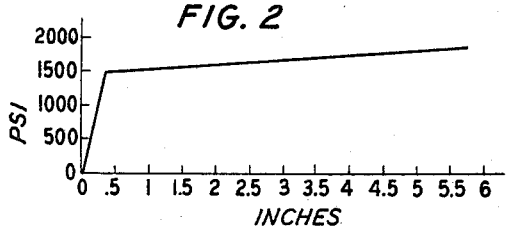
FIG. 2
INVENTORS A. L. HALE
F. A. REIDY
BY 
ATTORNEY United States Patent Office 3,385,169
Patented May 28, 1968

3,385,169
HYDRAULIC SYSTEM FOR MAINTAINING THE POSITION OF A FLUID MOTOR
Albert L. Hale, Berkeley Heights, N.J., and Francis A. Reidy, Brooklyn, N.Y., assignors to Bell Telephone Laboratories, Incorporated, New York, N.Y., a corporation of New York
Filed Sept. 30, 1965, Ser. No. 491,593
12 Claims. (Cl. 91—390)

ABSTRACT OF THE DISCLOSURE

A hydraulic system is disclosed which controls within a specified range the position of a component and also allows for relief movement of the component when subjected to forces above a predetermined magnitude. On removal of this force the component is returned to its last position. The relief and return mechanism operates the same regardless of the position of the component at the time the force is applied.

This invention relates to fluid systems, and more particularly, to hydraulic systems having accumulating means therein.

The use of accumulators in hydraulic systems is well known. Traditionally, they are used for storing fluids at specific predetermined pressures, to compensate for leakage, to reduce shock on a system, and to allow for changes in fluid volume due to pressure or temperature fluctuations.

The invention is embodied within a hydraulic system in which an accumulator is used not only in the traditional ways, but also as a spring or relief valve.

Hydraulic systems have been used to move or adjust components or pieces of equipment to certain desired locations or attitudes. If extraneous forces are exerted upon the component of sufficient magnitude as to approach mechanical failure of the component or overcoming of the hydraulic system, the prior art teaches the use of relief valves or accumulators to prevent component overstressing or system failure. However, such prior art practice results in a venting or return of system fluid to a reservoir with a consequent loss of system fluid. The practice may also result in a displacement of the component from the desired location or attitude thereby requiring an operator or a series of servo-valves or other similar equipment to return the component to its displaced position.

The instant system includes means for maintaining the forces exerted upon the component below a damaging level in combination with means for returning the component to its desired attitude after extraneous forces have been removed. Thus, the system operates automatically without the need of extra, costly equipment.

The invention will be better understood and its features and advantages more readily apparent upon the study of the following detailed description of an illustrative embodiment when it is read in conjunction with the drawing, in which:

FIG. 1 is a schematic diagram of a hydraulic system embodying the invention;

FIG. 2 is an exemplary diagram showing system pressure as a function of component displacement for the system shown in FIG. 1;

Figure 3:
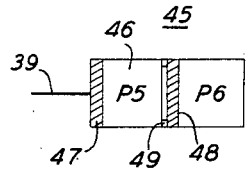
FIG. 3 is a section view of a modified accumulator.

The dotted lines in FIG. 1 represent mechanical couplings and the solid lines represent fluid or hydraulic lines or couplings.

In accordance with the illustrative embodiment of the invention, and as shown in FIG. 1, the invention comprises a motor 10 that is mechanically coupled to a pump 11. The pump 11 moves fluid, preferably hydraulic oil, from a reservoir 12 through hydraulic line 16 to a spool valve 13.

Though numerous separate reservoirs 12 have been shown in FIG. 1, it is understood that they may in fact represent only one reservoir 12. For convenience of FIG. 1, the single reservoir 12 has been given a plurality of appearances. The reservoir 12 is maintained at a predetermined pressure P1 which, in the illustration, is shown to equal approximately 5 p.s.i.

Between the valve 13 and the pump 11 is a relief valve 14. The valve 14 is biased by a spring 15 which holds the valve 14 in a closed position until the line pressure between the valve 13 and the pump 11 reaches a pressure P2, which for illustrative purposes is approximately 750 p.s.i. When the line pressure reaches a pressure equal to P2, the relief valve 14 opens and provides an alternate relief passage to the reservoir 12.

The spool valve 13 includes three alternative sets of fluid ports or couplings that are designated as 20, 21, and 44. The function of each set of portings will be subsequently described.

The set of couplings 44 allows the pump 11 to move fluid through line 16 and into line 17 to the reservoir 12. Between line 17 and reservoir 12 is a filter 18 and a directional valve 19. The valve 19 will permit flow in a direction from line 17 to the reservoir 12 but prohibits flow in a direction from the reservoir 12 toward line 17.

The valve 13 is operated by solenoids 22 and 23; both of the latter include drains to the reservoir 12. When the solenoid 22 is operated, ports 20 are inserted into the system such that line 16 is connected to line 24 and line 25 is connected to line 17.

The system further includes a cylinder 26 in which a piston 27 is located. The piston 27 is designed to prevent the flow of fluid in any way from one side of the piston 27 to the other. The piston 27 may communicate with the outside of the cylinder 26 by means of an extension 28 which may be in turn connected to the equipment or component that is to be controlled by the system. For illustrative purposes, the extension 28 is shown connected to a plow share 29 which is raised and lowered by means of the piston 27.

A directional pilot valve 30 is located between the line 24 and the cylinder 26 and is connected to the top of cylinder 26 by means of a hydraulic line 31. The valve 30 allows free flow of fluid in a direction from line 24 to line 31 but normally prevents fluid flow in a direction from line 31 to line 24.

From the bottom of the cylinder 26 extends a line 32 in which a metering valve 33 and a directional valve 34 are placed in parallel to each other between lines 32 and 25. A pressure tap 35 is located in line 32 and connected to the directional pilot valve 30.

When the ports 20 of the valve 13 are inserted into the system by the solenoid 22, the pump 11 moves oil through line 16 into line 24, then through the valve 30 into line 31 and then into the upper portion of the cylinder 26. Piston 27 is forced down, forcing the share 29 into the ground.

Oil from underneath the piston 27 flows into line 32 and through the metering valve 33. The directional valve 34 prevents flow in a direction from line 32 to line 25. Fluid then flows from line 25 through line 17 into the reservoir 12 as previously described. The function of the metering valve 33 is to place sufficient fluid resistance between the lines 32 and 25 to prevent free fall of the piston 27 due to its own weight.

When the ports 21 are inserted into the system by the solenoid 23, the pump 11 moves oil through line 16 and into line 25. The oil then flows freely through the directional valve 34 and into line 32. The flow through metering valve 33 can be considered negligible when compared to the flow through the valve 34 because the valve 34 has considerably less resistance to flow in the direction from line 25 to line 32 than that in the metering valve 33.

Oil then flows into the bottom of the cylinder 26 and forces the piston 27 up. Because the directional pilot valve 30 initially prevents flow in a direction from line 31 to line 24, the pressure in line 32 builds up. The pressure in line 32 is transferred through tap line 35 to the valve 30. Upon sensing a certain predetermined pressure P3 through the tap line 35, the valve 30 is operated and allows flow from line 31 to line 24. The fluid then proceeds from line 24 through the portings 21 into line 17 and from line 17 into the reservoir 12.

If it is desired to partially lower or raise the share 29, the portings 20 or 21 are placed into the system until the share 29 is in its desired position. The valve 13 is then switched to the position shown in FIG. 1 in which the ports 44 are in use. The cylinder 26 is then isolated from the pump 11 thereby maintaining the piston 27 in its desired position. Fluid is moved by the pump 11 into line 16 and directly into line 17 to the reservoir 12.

The embodiment of the invention as shown in FIG. 1 further includes an accumulator 36. The accumulator 36 is comprised of a cylinder 37 having a piston 38 contained therein. The piston 38 is designed to prevent the flow of fluid in any way from one side of the piston 38 to the other. The cylinder 37 is charged with a gas such as air, or helium, to a pressure P4, which in this case is illustrated as 1500 p.s.i., and is connected to the top of cylinder 26 by means of a hydraulic line 39. The effect of the charge or pressure P4 is to urge the piston 38 toward the line 39 thus restricting passage of oil into the cylinder 37 through line 39. Whenever the force exerted upon one side of the piston 38 by the pressure in the line 39 is less than the force exerted on the other side of the piston 38 by the charging pressure P4, the piston 38 is seated in a position so as to prevent or limit the flow of fluid from the line 39 into the cylinder 37.

The piston 38 is mechanically connected to a valve 40 by means of a connection 41. The valve 40 is placed in parallel with a directional valve 42 between the reservoir 12 and the line 32. The valve 42 prevents flow in a direction from the line 32 toward the reservoir 12. The valve 40 in its unoperated position shown in FIG. 1, has no ports or connections allowing flow in either direction between the reservoir 12 and line 32. However, the valve 40 may be operated by the piston 38 through the mechanical coupling 41. When it is operated, the valve port 43 is placed into the valve 40 so that flow is then permitted between the reservoir 12 and the line 32.

The operation of the accumulator system may be best described by first supposing that the accumulator 36 is not connected to the cylinder 26 by the line 39. If a force F were applied to the share 29, it would press the piston 27 toward the top of the cylinder 26. The pressure in the line 31 would increase but the pressure in the line 32 would tend to decrease. The valve 30 would not be opened because the pressure P3 required at the tap 35 in line 32 would not be obtained. The system would therefore attempt to resist the force F.

If the force F were of sufficient magnitude, one of two results would occur: either the share 29 would fail from overstressing or the system would be overcome by the application of a force F too large for it to resist. If the system were overcome, the piston 27 would be forced up into the cylinder 26 and oil would be lost somewhere in the system. Such an occurrence could happen if a line or valve were to fail. However, should the system be overcome, and the force F be relaxed, the system would be unable to return the piston 27 to its desired position without adding new fluid somewhere to the system.

When the accumulator 36, according to the invention, is added to the system as shown in FIG. 1, the application of a force F to the share 29 starts to force the piston 27 up in the cylinder 26. Pressure in the line 32 is lowered so that the valve 30 is not operated. Pressure in the lines 31 and 39 is increased. When the pressure in the line 39 reaches a pressure such that it exerts a force on one side of the piston 38 equal to the force exerted on the other side of the piston 38 by the charge generated by the pressure P4, the piston 38 moves in the cylinder 37 away from the line 39. Oil is then accumulated and stored under pressure in the cylinder 37 allowing the piston 27 to move up in the cylinder 26.

If the cylinder 37 is charged with a gas, large displacements of the piston 38 are possible with small pressure increases in the line 39 after the initial charge in the cylinder 37 is overcome. Thus, the force F is resisted until the pressure in the line 39 causes a displacemnt of the piston 38. At that point, a small increase in the force F deflects the piston 27, and consequently the share 29, by a large amount. The accumulator 36 acts as a spring and safety valve to prevent injury to the system.

The application of the universal gas law to the accumulator 36 demonstrates that once the initial charging pressure P4 is overcome, a doubling of the line pressure 39 results in the piston 38 moving halfway down the cylinder 37. Thus, half the cylinder 37 fills with oil.

The spring characteristic of the system therefore depends upon the various working pressures and the comparative volumes of the two cylinders 26 and 37. If the piston 38 moves halfway down the cylinder 37 because of a doubling of the line pressure in line 39, it follows that the physical dimensions of the cylinder 26 dictate how far the piston 27 will deflect in order to displace an equivalent amount of oil from the cylinder 26. Thus, once it is known how much deflection of the piston 27 is required to protect the equipment, the dimensions of the various cylinders 37 and 26 may be appropriately chosen.

The magnitude of the charging pressure P4 is determined by the magnitude of the maximum working force that the system can be subjected to before it is overcome or overstressed. Once a safe working force has been defined, the pressure P4 in the cylinder 37 is chosen so that any force F applied to the system in excess of the working force results in the displacement of the piston 38 and a consequent displacement of the piston 27.

It should be noted that because liquids are relatively incompressible (hydraulic oil compresses approximately ½% per 1000 p.s.i.), the spring constant of the system is extremely high until the force exerted on one side of the piston 38 by the pressure in line 39 is equal to the force exerted on the other side of the piston 38 by the charging pressure P4; then, the spring constant of the system is extremely low. This means that the system acts as a very stiff spring while the share 29 is in the ground but if the share 29 hits an immovable object and is in danger of being overstressed, the spring holding the share 29 in the ground appears to be very soft.

FIG. 2 shows an exemplary pressure-deflection curve for the system shown in FIG. 1. The initial steep portion of the curve reflects the compression of fluid in the various lines of the system and the elasticity of the lines before the piston 38 is moved. The shallow slope of the remainder of the curve reflects, in addition to the above, the compression of the charging gas in the accumulator 36.

As the piston 27 is moved upward in the cylinder 26, oil is pressed into the accumulator 36. If oil were not added to the cylinder 26 underneath the piston 27, a void would occur within the cylinder 26. Therefore, as the piston 27 is moved upward and the pressure in the line 32 decreases, the valve 42 allows oil to flow from the reservoir 12, through the valve 42 and into the bottom of the cylinder 26.

As the piston 38 moves, the port 43 is moved into the valve 40 by the coupling 41. This provides a second path from the reservoir 12 to the bottom of the cylinder 26. Oil flows from the reservoir 12 into the bottom of the cylinder 26 equal in amount to the oil that is forced into the accumulator 36.

According to the invention, when the force F is released, the pressure in the accumulator 36 forces the stored oil back toward the cylinder 26 through the line 39. Since the valve 30 prevents flow in the direction of the valve 13, the piston 27 is forced back to its downward position. Valves 13, 33, and 34 prevent flow of the oil out of the bottom of the cylinder 26, and valve 42 prevents flow to the reservoir 12.

However, until the piston 38 is bottomed, that is, until it has forced all of the stored oil out of the accumulator 36, the mechanical coupling will hold the port 43 in the operated position in the valve 40. Oil can then flow out of the bottom of the cylinder 26, through the port 43 in the valve 40 and into the reservoir 12. When the piston 38 bottoms, the coupling 41 releases the valve 40 which then prevents further flow of oil to the reservoir 12.

From the above it can be seen that the share 29 will be returned to the place from which it was displaced by the force F. As soon as the force F is relieved or removed, the pressure in the accumulator 36 moves the piston 27 back to the original position in which it was placed before it was disturbed by the force F.

The spring characteristics of the system can be modified to obtain different force-deflection relations by changing the design of the accumulator. FIG. 3 shows an accumulator 45 that is comprised of a cylinder 46 having two pistons 47 and 48 contained therein. An annular ring 49, or other equivalent stop means, separates the two pistons 47 and 48 and prevents them from coming together in the cylinder 46. The volume between the piston 47 and the piston 48 is charged with a pressure P5 and the volume on the other side of the piston 48 is charged with a pressure P6. For illustrative purposes, the pressure P6 is greater than the pressure P5.

When the accumulator 45 shown in FIG. 3 is inserted into the system shown in FIG. 1 by connecting the line 39 to the accumulator 45 as shown, a different force-deflection relationship is obtained. As the force F is applied to the share 29, the system works as previously described; that is, the pressure in the line 31 increases and the pressure in the line 32 decreases. When the pressure in the line 39 increases to a pressure that is sufficient to overcome the force exerted on the side of the piston 47 by the charging pressure P5, the piston 47 moves toward the piston 48 thereby allowing oil to accumulate in the cylinder 46.

Figure 5:
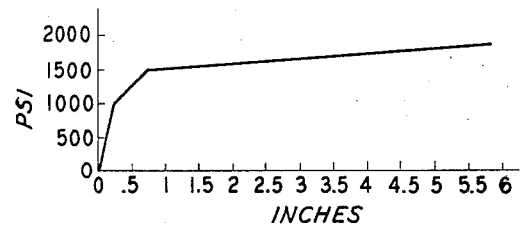
FIG. 5 is an exemplary pressure-deflection diagram for a system including the accumulators shown in FIG. 3 or 4.

Since the pressure P6 behind the piston 48 is greater than P5, the piston 48 does not move until the piston 47 has been displaced a sufficient amount to raise the pressure P5 to a magnitude equal to P6. Any continued increase in pressure in the line 39 then displaces both pistons 47 and 48. Depending upon the charging pressures P5 and P6, the pressure-deflection curve can be adjusted. An exemplary representative curve of a system using the two-stage accumulator 45 is shown in FIG. 5.

The effect of inserting the accumulator 45 in the system is to provide the system with a spring having multiple spring constants that are a function of the pressures P5 and P6. Until the pressure P5 is overcome, the systems act similar to the system shown in FIG. 1; that is, as a very stiff spring. When the pressure P5 is overcome by a sufficient increase in the line pressure in line 39, the piston 47 moves in accordance with the universal gas law. The piston 47 appears to be acted upon by a softer spring in that a smaller increase in the force F applied to the share 29 is required to move the piston 47 a given distance after the pressure P5 has been overcome than was required to move the piston 47 that same distance before the pressure P5 was overcome.

As the line pressure in the line 39 continues to increase, the piston 47 moves and increases the pressure P5 until it equals pressure P6. At that point, the pistons 47 and 48 move simultaneously and the spring constant of the accumulator 45 appears to be softer again. In other words, a smaller increase in the force F applied to the share 29 is required to move the piston 27 a given distance after the pressure P6 has been overcome than was required to move the piston 27 that same distance before the pressure P6 was overcome.

Figure 4:
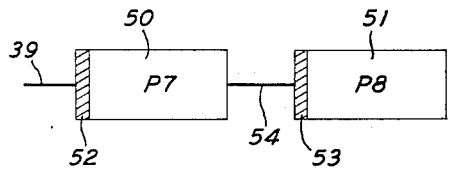
FIG. 4 is a section view of another modified accumulator.

The accumulator 45 shown in FIG. 3 can be modified for economic reasons as shown in FIG. 4. The accumulator shown in FIG. 4 is comprised of two cylinders 50 and 51. The cylinder 50 includes a piston 52 and the cylinder 51 includes a piston 53. Cylinder 50 is charged to a pressure P7 and cylinder 51 is charged to a pressure P8. The pressure P8 is greater than the pressure P7. Cylinder 50 is connected to cylinder 51 by means of a pressure line 54. Thus, the pressure behind the piston 52 is transferred to the face of the piston 53 in the cylinder 51.

The accumulator shown in FIG. 4 may be inserted into the system shown in FIG. 1 by connecting the hydraulic line 39 to the cylinder 50 as shown. The operation of the system is substantially the same as that of the system when the accumulator 45 is inserted. The pressure deflection curve shown in FIG. 5 will also be representative of the accumulator shown in FIG. 4.

The multiple-chamber accumulators in FIGS. 3 and 4 show the chambers connected in series. It is obvious to those skilled in the art and within the contemplation of the invention, to connect the chambers of the accumulators in parallel. The pressure-deflection diagram shown in FIG. 5 would be qualitatively the same for such an accumulator.

It is obvious to those skilled in the art that numerous changes and modifications in addition to those suggested may be made to the embodiment as it has been disclosed above without departing from the scope and spirit of the invention as it has been disclosed in the above specification and the appended claims.

What is claimed is:

1. A fluid system comprising a fluid source and a cylinder having a piston therein, valve means interposed between said source and said cylinder, said means selectively connecting and disconnecting said source and said cylinder and selectively connecting said source to said cylinder on opposite sides of said piston, said piston including means for applying an external force to said piston, accumulating means operably connected to said cylinder on one side of said piston, said accumulating means only responsive to a predetermined force applied to said piston, said accumulating means upon sensing said predetermined force adapted to receive fluid from said cylinder and maintain the magnitude of said force applied to said piston substantially equal to said predetermined force by allowing said piston to be displaced in said cylinder, and, return control means connected to said cylinder, said control means operably connected to said accumulating means and operated only in response to the operation of said accumulating means and when said fluid source is disconnected from said cylinder by said valve means, said control means selectively supplying fluid to said cylinder in proportion to the fluid displaced into said accumulating means and receiving fluid from said cylinder equal in amount to the displaced fluid upon the removal of said force upon said piston.

2. The system described in claim 1 wherein said control means is mechanically connected to said accumulating means.

3. The device of claim 2 wherein said accumulating means comprises a second cylinder having a piston therein, means for transferring said force applied to said first mentioned piston to a first side of said piston in said second cylinder, said second cylinder including a gas under a predetermined pressure, said pressure exerting a force on a second side of said piston in said second cylinder equal and opposite to the force applied to said first side of said last mentioned piston by said predetermined force applied to said first mentioned piston.

4. A fluid system comprising a cylinder having a piston therein, means for moving said piston within said cylinder and means for applying a force to said piston, accumulating means operably connected to said cylinder, said last mentioned means responsive to a first predetermined force and to a second predetermined force applied to said piston, said accumulating means upon sensing said first predetermined force adapted to receive fluid from said cylinder and maintain the magnitude of said force applied to said piston substantially equal to said first predetermined force, said accumulating means upon sensing said second predetermined force adapted to receive fluid from said cylinder and maintain the magnitude of said force applied to said piston substantially equal to said second predetermined force, and, control means connected to said cylinder and said accumulating means, said control means operable only in response to the operation of said accumulating means, said control means alternately supplying fluid to said cylinder and receiving fluid from said cylinder in proportion to the amount of fluid received in said accumulating means.

5. The system described in claim 4 wherein said first predetermined force is of less magnitude than said second predetermined force.

6. A fluid system comprising a fluid source and a cylinder having a piston therein, valve means interposed between said source and said cylinder, said means selectively connecting and disconnecting said source and said cylinder and selectively connecting said source to said cylinder on opposite sides of said piston, said piston including means for applying an external force to said piston, accumulating means operably connected to said cylinder on one side of said piston, said accumulating means responsive to a first predetermined force and to a second predetermined force applied to said piston, said accumulating means upon sensing said first predetermined force adapted to receive fluid from said cylinder and maintain the magnitude of said force applied to said piston substantially equal to said first predetermined force by allowing said piston to be displaced in said cylinder, said accumulating means upon sensing said second predetermined force adapted to receive fluid from said cylinder and maintain the magnitude of said force applied to said piston substantially equal to said second predetermined force by allowing said piston to be further displaced in said cylinder, and, return control means connected to said cylinder, said control means operably connected to said accumulating means and operated only in response to the operation of said accumulating means and when said fluid source is disconnected from said cylinder by said valve means, said control means selectively supplying fluid to said cylinder in proportion to the fluid displaced into said accumulating means and upon removal of said force upon said piston receiving fluid from said cylinder equal in amount to the displaced fluid.

7. The system described in claim 6 wherein said control means is mechanically connected to said accumulating means.

8. The system of claim 6 wherein said accumulating means comprises at least a first and a second chamber, each of said chambers having a piston therein, means for transferring said force applied to said first mentioned piston to a first side of said piston in said first chamber, said first chamber including a gas under a first pressure, said first pressure exerting a force on a second side of said piston in said first chamber equal and opposite to the force applied to said first side of said last mentioned piston by said first predetermined force applied to said first mentioned piston, said second chamber including a gas under a second pressure, said second pressure being greater than said first pressure, means for transferring said force from said second side of said piston in said first chamber to a first side of said piston in said second chamber, said second pressure exerting a force upon a second side of said piston in said second chamber equal and opposite to the force applied to said first side of said piston in said first chamber by said second predetermined force applied to said first mentioned piston.

9. The system described in claim 8 wherein said first predetermined force is of less magnitude than said second predetermined force.

10. A spring system comprising a cylinder having a piston therein, means for supplying fluid to said cylinder and for operating said piston, means for applying a force to said piston, accumulating means operably connected to said cylinder, said accumulating means responsive to a first predetermined force and to a second predetermined force applied to said piston, said accumulating means upon sensing said first predetermined force adapted to maintain the magnitude of said force applied to said piston substantially equal to said first predetermined force, said accumulating means upon sensing said second predetermined force adapted to maintain the magnitude of said force applied to said piston substantially equal to said second predetermined force, and control means connected to said cylinder and to said accumulating means, said control means operable only in response to the operation of said accumulating means, said control means adapted to control the movement of said piston within said cylinder.

11. The system described in claim 10 wherein said accumulating means comprises a first and a second chamber, each chamber having a piston contained therein, said first chamber including a gas under a first pressure and said second chamber including a gas under a second pressure, said pressure in said second chamber being greater than said pressure in said first chamber, said gas in said first chamber exerting a force upon the piston in said first chamber in opposition to said first predetermined force applied to said first mentioned piston, and said gas in said second chamber exerting a force upon said piston in said second chamber in opposition to the force exerted on said piston in said second chamber by the gas in said first chamber.

12. The system of claim 11 wherein said first predetermined force is of less magnitude than said second predetermined force, means interconnecting said first chamber and said second chamber, said gas in said second chamber exerting a force on said piston in said second chamber equal and opposite to said second predetermined force applied to said first mentioned piston.

References Cited

UNITED STATES PATENTS

| | | | |
|---|---|---|---|
| 1,881,185 | 10/1932 | Hazelton | 60—54.5 |
| 2,721,446 | 10/1955 | Bumb | 60—51 |
| 2,752,754 | 7/1956 | Jaseph | 60—51 |
| 2,940,263 | 6/1960 | Cudnohufsky | 91—459 |
| 2,775,255 | 12/1956 | Snyder | 138—31 |
| 3,015,345 | 1/1962 | Michael | 138—31 |
| 3,064,687 | 11/1962 | Natho et al. | 138—31 |
| 3,122,992 | 3/1964 | Kautz | 60—51 |
| 3,058,448 | 10/1962 | Wagner | 91—390 |

OTHER REFERENCES

Henke, R.: "Hydraulic Systems," Machine Design, June 1964, page 144.

MARTIN P. SCHWADRON, *Primary Examiner.*

B. L. ADAMS, *Assistant Examiner.*